United States Patent

[11] 3,578,149

[72] Inventor Charles Thomson
  Wokingham, England
[21] Appl. No. 876,201
[22] Filed Dec. 1, 1969
  Continuation of Ser. No. 720,189,
  April 10, 1968, abandoned
[45] Patented May 11, 1971
[73] Assignee Solar Thomson Engineering Company
  Limited
  Surrey, England
[32] Priority Oct. 12, 1967
[33] Great Britain
[31] 16885/67

[54] BELT CONVEYORS
  4 Claims, 12 Drawing Figs.
[52] U.S. Cl. .................................................... 198/201
[51] Int. Cl. .................................................... B65g 15/62

[50] Field of Search ........................................... 198/201,
  203, 193

[56] References Cited
  UNITED STATES PATENTS
  381,456 4/1888 Woodbury .................... 198/201
  3,351,179 11/1967 Thomson ...................... 198/203
  3,368,664 2/1968 Skinner ........................ 198/193

Primary Examiner—Richard E. Aegerter
Attorney—Stevens, Davis, Miller & Mosher

ABSTRACT: A belt conveyor having an endless carrier belt, and endless drive belt in frictional driving engagement with the inner surface of the carrier belt, and support means traveling with the carrier belt, and support along the load carrying flight thereof for supporting the carrier belt in a troughed configuration.

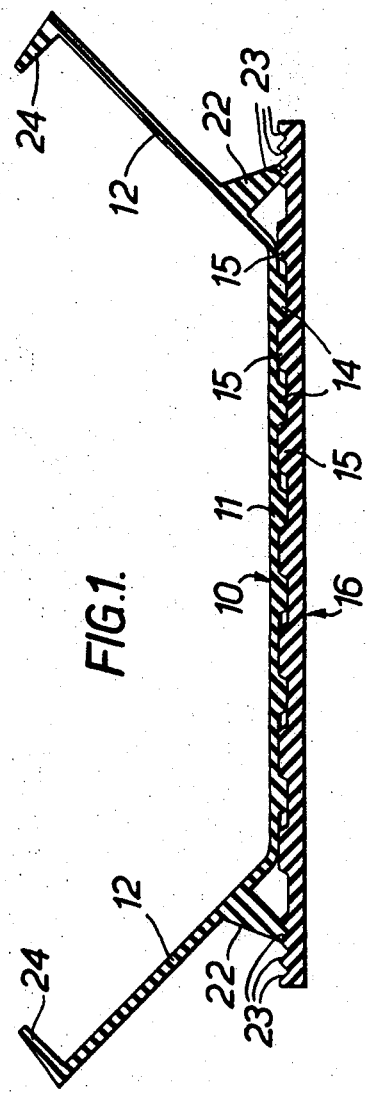
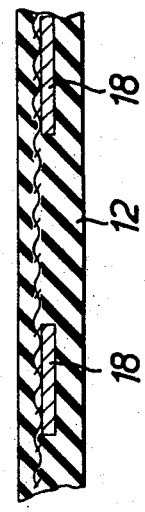

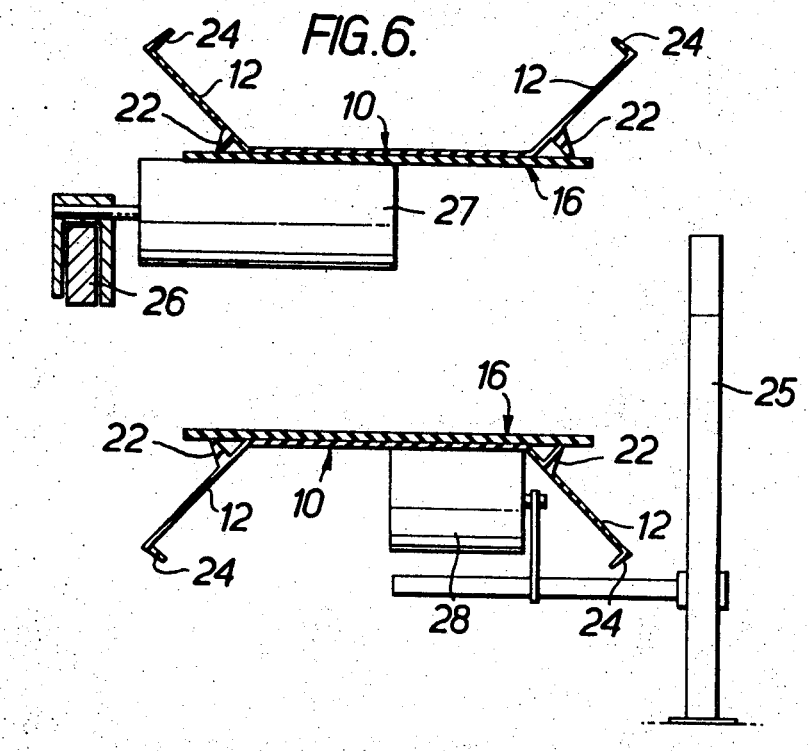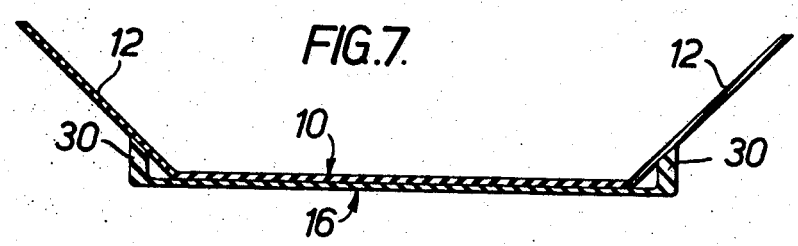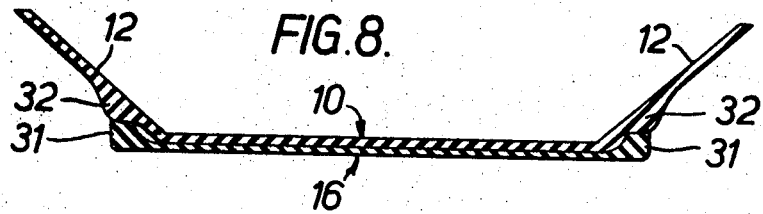

BELT CONVEYORS

This is a continuation of application Ser. No. 720,189 filed Apr. 10, 1968, now abandoned.

This invention relates to belt conveyors of the kind having an endless carrier belt and at least one endless drive belt in frictional driving engagement with the inner surface of the carrier belt at least along the load-carrying flight thereof. The term "drive belt" includes flat belts and also cables and other elongated driving and supporting members.

Conventionally, inclined idler rollers (wing rollers) are employed in such conveyors to support the marginal portions of the carrier belt so that the carrier belt has a troughed configuration. It is an object of the present invention to provide improved means for supporting the carrier belt in a troughed configuration.

According to the present invention, a belt conveyor of the kind referred to has support means for supporting the carrier belt in a troughed configuration, which support means travel with the carrier belt at least along the load-carrying flight thereof.

Preferably, the support means are disposed between the drive belt and the carrier belt and may comprise projections carried by at least one of said belts and engageable with the other belt or with projections carried by said other belt. The projections preferably engage means, e.g. ribs, carried by said other belt, which restrain the projections from lateral movement.

Preferably the projections extend continuously along the belt carrying them. They are preferably made in one piece with the belt. In a preferred construction, the support means comprise continuous deep ribs or projections on the inside of the carrier belt which engage and are laterally located by shallow ribs on the outside of the drive belt.

The carrier belt may be reinforced. The reinforcement may comprise means allowing bending of the longitudinal edge portions relative to a longitudinal central portion of the carrier belt, and the reinforcement means may be metal straps, which may be separated between the edge portions and the central portion of the carrier belt. Alternatively or additionally the drive belt may be reinforced. Inwardly projecting retainer flanges may be provided along the edges of the carrier belt.

For a better understanding of the invention, and to show how the same may be carried into effect, reference will now be made, by way of example, to the accompanying drawings, wherein:

FIG. 1 is an outline view, taken in transverse cross section, of the upper flight of a drive belt and a carrier belt of a conveyor according to one embodiment of the invention;

FIG. 2 is a fragmentary longitudinal section through the carrier belt of FIG. 1;

FIG. 6 shows a diagrammatic transverse cross section through the conveyor of FIGS. 4 and 5;

Figure 10:
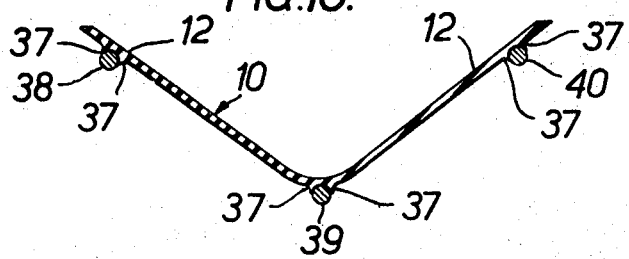
Figure 11:
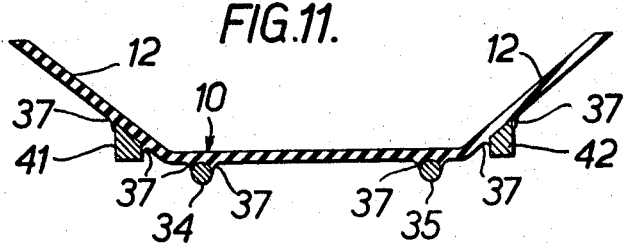
Figure 12:
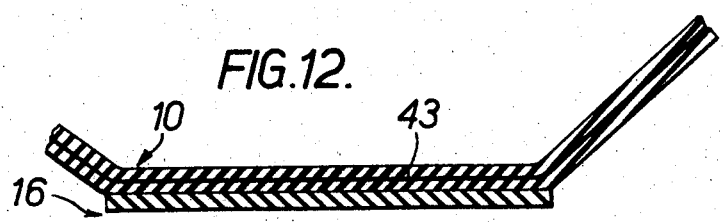

FIGS. 7 to 11 each consist of a view similar to FIG. 1 and show different embodiments of the invention; and FIG. 12 is a fragmentary view similar to FIG. 1 showing a further embodiment.

Figure 3:
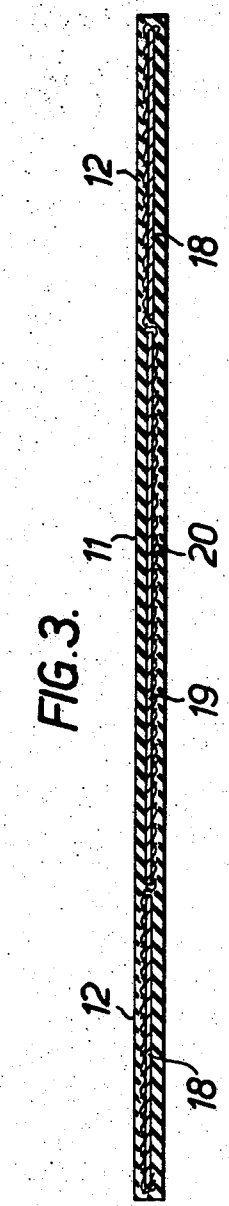
FIG. 3 is a transverse cross section through the carrier belt of FIG. 1.

In FIGS. 1 to 6 of the drawings a carrier belt 10 has the inner surface of its central portion 11 formed with longitudinal ribs 14 which interengage with longitudinal ribs 15 on the outside of the drive belt 16 to oppose relative lateral movement of the carrier belt 10 and the drive belt 16. The ribs 15 also engage in grooves in a roller (not shown). The drive belt 16 has a rubber body and has low longitudinal elasticity and good lateral dimensional stability. The carrier belt 10 is made of rubber reinforced by steel straps 18 and 19 of rectangular cross section and a fabric 20 (FIGS. 2 and 3). The straps 18 and 19 are arranged in sets spaced apart along the carrier belt 10 and each comprising two straps 18 and one strap 19 and extending transversely across the carrier belt 10, the straps 18 being provided in the edge portions 12 and the straps 19 being provided in the central portion 11 of the carrier belt. The fabric 20, which is such as to give the carrier belt 10 a high longitudinal elasticity, extends over the straps 18 and beneath the straps 19 (see FIG. 3) to counteract separation of the fabric 20 from its rubber covering when the conveyor is loaded.

The edge portions 12, each of which extends over one quarter of the width of the carrier belt, are thus in effect hinged to the central portion 11. They are supported on the load-carrying flight in an upwardly and outwardly inclined position by downwardly and outwardly protruding projections in the form of support shoes 22, which are located so that under normal loading the edge portions 12 do not tend to pivot about the shoes 22 and thus stress the belt 10 where the edge portions 12 meet the central portion 11. The shoes 22 engage in grooves 23 in the drive belt 16, the grooves 23 which are provided between shallow longitudinal ribs on the belt 16, restraining the support shoes 22 from lateral movement inwards and outwards. As can be seen from FIG. 1 there are three grooves 23 at each side of the drive belt 16 to facilitate location of the shoes in the grooves.

The outer edges of the carrier belt 10 are provided with upwardly and inwardly inclined retainer flanges 24 which serve to retain material being carried on the carrier belt 10 and which facilitate coiling of the carrier belt 10 for storage or transport.

Figure 4:
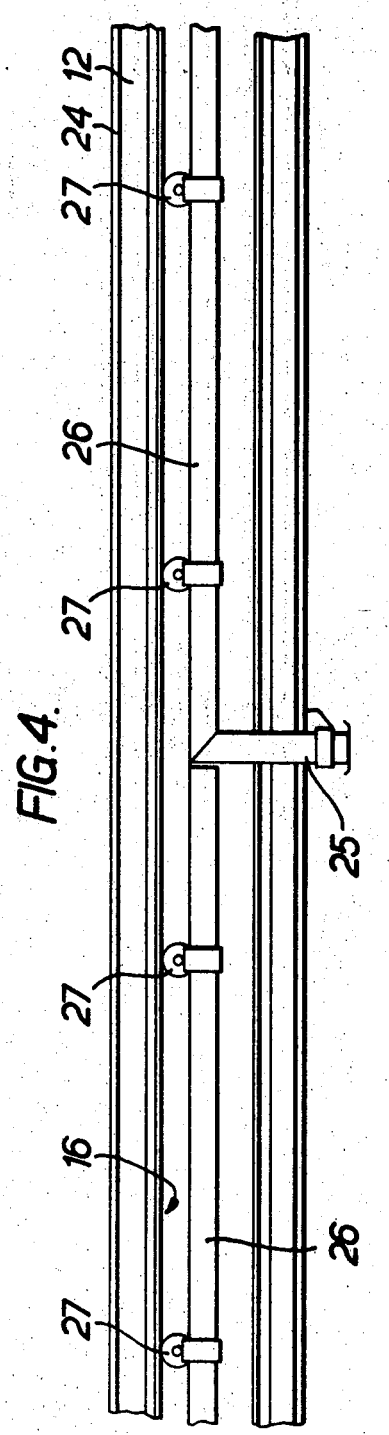
FIG. 4 is a fragmentary side elevation of a conveyor including the belts of FIG. 1.
Figure 5:
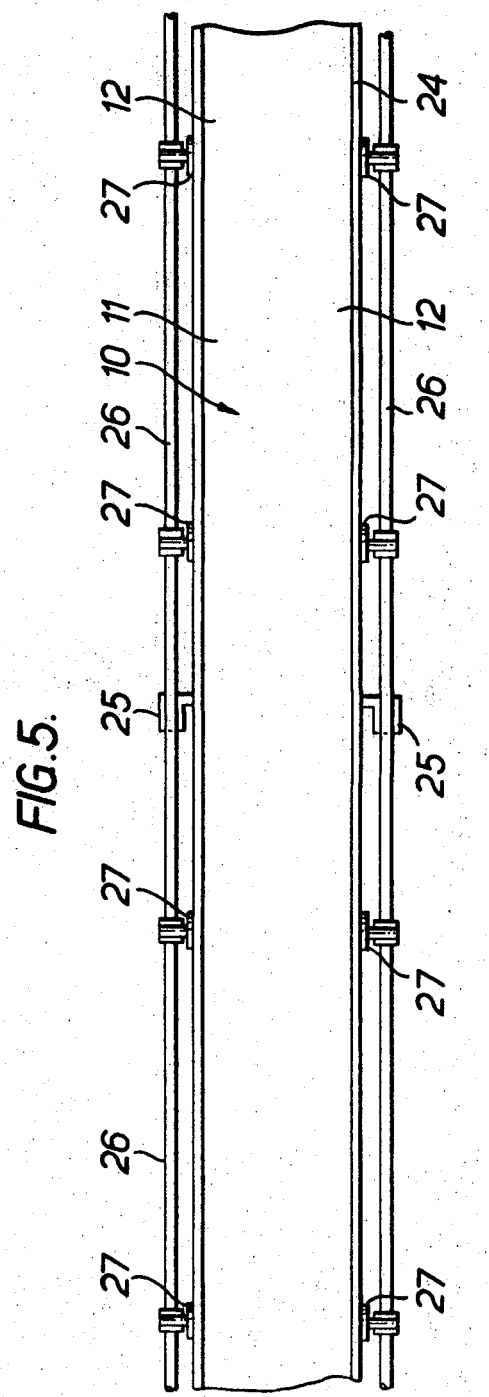
FIG. 5 is a fragmentary plan view corresponding to FIG. 4.

The conveyor illustrated in FIGS. 4 to 6 has stanchions 25 carrying beams 26 between which rollers 27 are mounted for supporting the upper flight of the drive belt 16. While only one drive belt 16 is shown in the drawings, it will be understood that if required a plurality of drive belts may be provided along the carrier belt 10, which may be supported on conventional wing rollers at positions where the carrier belt has left the drive belts. Each drive belt is driven by a suitable motor.

The lower flight of the carrier belt 10 is supported at the central portion 11 only by rollers 28 (FIG. 6) of which only one is shown in the drawings, and which are secured to the stanchions 25, the lower flight of the drive belt 16 being carried on the carrier belt 10. The carrier belt 10 runs over the rollers 28 with a self-centering action since any tendency of the carrier belt 10 to wander laterally will cause the depending edge portions 12 to run against the rollers 28.

At the ends of the conveyor, the carrier belt 10 and the drive belt 16 run around separate drums (not shown), and known tensioning arrangements, e.g. gravity or hydraulic takeups (not shown), are provided for the drive belt 16, while very simple arrangements such as screws or springs are provided for tensioning the carrier belt 10.

The support shoes 22 preferably comprise continuous longitudinal ribs.

The ribs 14 and 15 are shaped so as to ensure that the conveyor belt 16 is held firmly positioned on the drive belt 10, which as shown in the drawing is sufficiently wide to allow some misalignment of the belts. The carrier belt is placed on the drive belt in a troughed shape so that the support shoes are properly positioned in the grooves in the drive belt.

The conveyor is preferably constructed as described in United Kingdom Patent Specification No. 1,502,240.

The carrier belt 10 can be loaded to the level of the flanges 24 and therefore has a greater capacity than a conventional carrier belt which runs over wing rollers and which has a greater tendency to "track" laterally and spill its load.

The carrier belt 10 is provided with its hinge points (i.e. the junctions between the edge portions and the central portion) spaced from the edges of the carrier belt for a quarter of the width of the belt since this arrangement gives a good carrying capacity and allows large lumps to be carried without abnormal loading arising on the belt. (Abnormal loading occurs when large lumps are carried which span from one hinge point across the other on to an edge portion of the belt).

FIG. 7 shows a modification wherein the drive belt 16 is provided along each edge with an upstanding projection 30 which bears against the corresponding edge portion 12 of the carrier belt 10. Thus in this case the means for supporting the edge portions of the carrier belt in their troughed condition are provided by the drive belt.

In the embodiment of FIG. 8, the drive belt 16 is provided with projections 31 similar to the projections 30 but of reduced height. On the underside of each edge portion 12 of the carrier belt at the portion in contact with the corresponding projection 31 is a downwardly facing projection 32. Thus in this arrangement the means for supporting the edge portion of the carrier belt in their troughed condition are provided in part by the drive belt and in part by the carrier belt.

Figure 9:
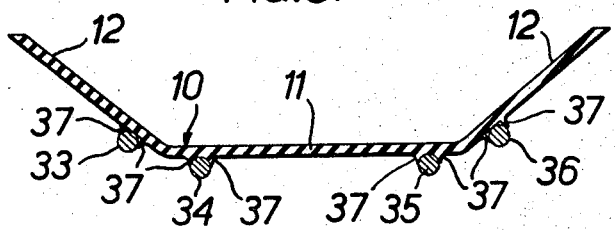

FIG. 9 shows an arrangement wherein the drive belt 16 has been replaced by drive cables 33, 34, 35 and 36. On the underside of the carrier belt 10 and on each side of each drive cable is a narrow projection 37 for guiding the respective cable with the belt. The cables 34 and 35 support the central portion 11 of the carrier belt whereas the cables 33 and 36 support the edge portions 12 and hold the edge portions 12 in their troughed condition. Thus in this arrangement it is the disposition of the drive cables which causes the carrier belt 10 to adopt its troughed shape.

In FIG. 10, only three drive cables 38, 39 and 40 are provided, and these are so arranged that the carrier belt 10 is caused to have a V-sectioned trough.

The embodiment of FIG. 11 is substantially the same as that of FIG. 9 except that the cables 33 and 36 have been replaced by further cables 41 and 42 having a particular cross-sectional shape. The upwardly facing surface of each cable 41 and 42 faces inwardly towards the longitudinal center line of the carrier belt 10. Thus in this case it is the configuration of the cables supporting the edge portions 12 of the carrier belt which causes the carrier belt to assume its troughed shape.

FIG. 12 shows a drive belt 16 and a part of a carrier belt 10, the carrier belt being reinforced internally by a continuous steel band 43 which is formed to remain in a troughed shape either before or after insertion in the belt so that when the carrier belt is supported by the drive belt 16 the carrier belt will assume its troughed shape. The band 43 could alternatively be attached externally to the belt 10.

Various modifications may be made in the above described conveyor arrangements. For example, the reinforcement in the carrier belt can in some causes be omitted. The carrier belt may be reinforced by continuous nonhinging straps acting in bending, by three longitudinal steel bands which act in bending and still allow hinging, by continuous hinging straps which act in bending and in which hinging is provided by reduced section or reduced modulus of rigidity, by a wire-fabric acting in bending with reduced wire sections or a reduced number of wires at the hinges, by three wire fabrics with a fabric hinge acting in bending, by three longitudinal bands acting in bending or sets of three straps with a nylon or other flexible hinge, or by any of the above arrangements where as the result of bonding the reinforcement acts as tension or compression members in conjunction with the belt as a matrix.

As seen in FIG. 12 the carrier belt may be preformed (e.g. by suitable bending of the reinforcements) to be of troughlike configuration so that a hinging action in a flat carrier belt as hereinbefore described is not necessary to obtain troughing.

The means for supporting the carrier belt in its troughlike configuration may comprise members separate from the carrier and drive belts. Reinforcing straps may be provided only in the edge portions of the carrier belt, the central portion being without straps. Instead of having two hinge points in the carrier belt, only one central hinge point may be provided.

Two or more separate parallel driving belts may be provided with the carrier belt suspended between. The drive belt may be unribbed adjacent the support shoes, or ribs may be provided only for preventing inwards movement of the support shoes. The drive belt may be only of sufficient width to support the carrier belt. Two or more fabric plies may be provided in the carrier belt at the hinge point or points. No fabric may be provided at the hinge point or points. Straps or other reinforcement may be placed wholly on top or below a fabric ply or plies or straps may be disposed in the opposite way to that described with reference to FIGS. 2 and 3 of the drawings. The support shoes need not necessarily be arranged to set the edge portions of the carrier belt in equilibrium under normal loading, the necessary restraint being provided by tension at the hinge point. Instead of placing the carrier belt in troughed shape on the drive belt as hereinbefore described, the carrier belt when flat may be placed on the drive belt, support shoes carried by the carrier belt being allowed to slide outwards under load. If the support shoes are carried by the drive belt, the carrier belt will simply roll on the shoes into the desired shape.

As compared with this conventional conveyor, the above-described conveyors require less rollers, since the wing rollers are omitted and the remaining rollers can be spaced further apart, thus reducing the number of moving parts and the maintenance required. Moreover, the above-described conveyors avoid the disadvantages of the conventional conveyor that, using wing rollers to support the edge portions, the carrier belt sags between successive wing rollers and therefore increases the frictional resistance of the conveyor and reduces the capacity of the conveyor, and that the wing rollers can cause the carrier belt to "track" laterally when the conveyor is driven while unloaded. Also only nominal tension is required in the carrier belt and expensive reinforcement and tension arrangements are avoided.

I claim:

1. Belt conveyor apparatus comprising an endless carrier belt arranged to travel along a flight for carrying a load therealong, an endless drive belt arranged to drive the carrier belt by frictional engagement with a substantial portion of the inner surface of the carrier belt along the load-carrying flight thereof, said carrier belt comprising a central portion and edge portions hingedly connected to the central portion, and substantially continuous support means extending between said edge portions and the drive belt and supporting said edge portions on the drive belt in an upwardly-hinged position.

2. Belt conveyor apparatus according to claim 1 wherein the support means comprise ribs on said edge portions which engage ribs on the drive belt, said ribs on the drive belt preventing lateral movement of the ribs on the edge portions away from one another and thereby enabling the ribs on the edge portions to support said edge portions in an upwardly-hinged position.

3. Belt conveyor apparatus according to claim 1 wherein reinforcing elements are provided in said central portions and edge portions, which elements permit of hinging movement of the edge portions.

4. Belt conveyor apparatus according to claim 3 wherein a fabric web is provided in the carrier belt above and below the reinforcing elements in the central portion and the reinforcing elements in the edge portions.